United States Patent
Kramski

(10) Patent No.: US 6,918,713 B2
(45) Date of Patent: Jul. 19, 2005

(54) CYLINDRICAL PIN

(75) Inventor: Wiestaw Kramski, Birkenfeld (DE)

(73) Assignee: Kramski GmbH, Pforzheim (DE)

( * ) Notice: Subject to any disclaimer, the term of this patent is extended or adjusted under 35 U.S.C. 154(b) by 0 days.

(21) Appl. No.: 10/412,445

(22) Filed: Apr. 11, 2003

(65) Prior Publication Data

US 2003/0194291 A1 Oct. 16, 2003

(30) Foreign Application Priority Data

Apr. 12, 2002 (DE) ............................. 102 16 412
Oct. 21, 2002 (EP) ............................. 02023445

(51) Int. Cl.[7] ............................................. F16B 7/00
(52) U.S. Cl. ........................ 403/292; 411/479; 411/182
(58) Field of Search ............................... 411/339, 351, 411/513, 514, 479, 521, 460, 388, 180, 181, 182; 403/292, 294

(56) References Cited

U.S. PATENT DOCUMENTS

| 1,743,492 A | * | 1/1930 | Sipe | ............................. 403/297 |
| 2,284,449 A | * | 5/1942 | Rodess | ......................... 269/261 |
| 3,132,557 A | | 5/1964 | Bauer | |
| 3,232,160 A | * | 2/1966 | Fork et al. | .................... 411/479 |
| 3,442,170 A | * | 5/1969 | Lang et al. | .................. 411/479 |
| 4,129,007 A | * | 12/1978 | Rausch | ..................... 405/259.6 |
| 4,130,369 A | | 12/1978 | Wojcik | |
| 4,384,804 A | * | 5/1983 | Cachia et al. | ................ 403/345 |
| 4,806,064 A | * | 2/1989 | Breese | ......................... 411/479 |
| 5,362,185 A | | 11/1994 | Haack | |
| 5,678,444 A | | 10/1997 | Nagamori | |

FOREIGN PATENT DOCUMENTS

DE 2045726 A 3/1972

* cited by examiner

Primary Examiner—Flemming Saether
(74) Attorney, Agent, or Firm—Volpe and Koenig, P.C.

(57) ABSTRACT

A cylindrical pin (1) for connecting and/or guiding components (A, B), particularly in tool, fixture, and machine construction is provided. In order to make the cylindrical pin yieldable in a radial direction and thereby allow for compensation for its manufacturing tolerance, the cylindrical pin is provided with an internal bore (4, 6) extending in the axial direction at least over a partial region (1a, 1c) of the pin.

10 Claims, 3 Drawing Sheets

CYLINDRICAL PIN

BACKGROUND

The invention relates to a cylindrical pin for connecting and/or guiding components, particularly in tooling, fixture and machine construction, which has a cylindrical circumferential surface. Such cylindrical pins are above all used for arresting or pinning plates, individual elements, or tool portions for cutting, stamping, or shaping tools. The dimensions of the cylindrical pins are regulated by standards, particularly DIN 6325 or ISO 8734, and the fit is also predetermined as m5 or m6 in order to enable the cylindrical pins, together with the bores in which they fit, to produce the desired connection of two components.

The case of application to cutting, stamping and shaping tools and also the fit m6 or m5 already show that there are high precision requirements for the cylindrical pins and the associated bores in the respective components. However, even if these requirements mean that tolerances of a few micrometers must be adhered to, the tolerances can add up to a correspondingly large excess of, for example, up to 5 μm (thus, roughly double), so that all the precision requirements can no longer be satisfied. In such cases, too great of a tolerance accumulation in the fit of the cylindrical pin and bore leads in the extreme case to the mutual pressure being too high, so that a mutual welding of the materials of the cylindrical pin and bore wall results, which is in general termed "seizing". This "seizing" leads to a damaged or distorted bore wall, so that the associated components in the region of this bore can no longer be re-pinned without re-machining after removal of the welded cylindrical pin.

SUMMARY

Starting from this, the present invention has as its object to make available a cylindrical pin of the kind mentioned at the beginning, which makes possible a connection and/or guiding of components with greater tolerances, without negatively affecting precision. Furthermore, repeated dismantling is to be possible without damage to the bore wall and thus without a "seizing", and accordingly the pressure between the cylindrical pin and the bore wall is not to be too high.

This object is attained according to the invention in that the cylindrical pin is provided with a central internal bore extending over a substantial portion of the axial length of the pin, with the resulting advantage that the cylindrical pin is yieldable in the radial direction, at least in this region having the internal bore, insofar as the internal bore is correspondingly large in comparison with the external diameter of the cylindrical pin, and the wall thickness of the cylindrical pin thus remaining is correspondingly small. Such a radially yieldable cylindrical pin now provides the fundamental advantage that the manufacturing tolerances of the cylindrical pin are no longer of such importance and no longer have such undesired consequences, since some oversize of the cylindrical pin can be compensated for by the radial yieldability and hence is no longer has an effect.

A precondition for this elimination of the consequences of the cylindrical pin tolerance is the production of the cylindrical pin with a basic oversize as regards an external, diameter, the cylindrical pin being intentionally manufactured with a greater diameter than required, so that exactly the required diameter results after subtracting the manufacturing tolerances. This oversize can, for example, be of the order of magnitude of 5–10 μm, thereby ensuring that a diameter of the cylindrical pin is obtained in each case which is equal to or greater than the required diameter.

With respect to the internal bore, it is important that this is precisely central, for which reason it is advisable for it to be ground in order to obtain an exactly central symmetry; because if the internal bore were to be slightly offset from the mid-axis of the cylindrical pin, the elastic yieldability would no longer be of equal magnitude over the circumference of the cylindrical pin, and this would then mean that the two components to be fixed together by the cylindrical pin would be positioned with a slight mutual offset.

The internal bore can extend in the axial direction over the whole length of the cylindrical pin, starting from one end of the cylindrical pin, so that the cylindrical pin becomes similar to a cylindrical bushing. Likewise it is however also possible for the cylindrical pin to be divided into a first partial region, which has the internal bore so that it is radially yieldable, and extends from one axial end of the pin, and arranged adjacent thereto a waisted middle region, in particular provided with a cross sectional reduction of the circumferential surface, and adjacent thereto, a radially yieldable second partial region likewise having an internal bore and extending as far as the other axial end of the pin. If the axial lengths of the two partial regions and the middle region are mutually consistent so that the cylindrical pin is either radially yieldable or in any case is provided with a smaller external diameter because of the waisting, it can be thereby ensured that the cylindrical pin has the required dimension over its whole length.

The waisted middle region, which is to form a shoulder with respect to the adjacent internal bore(s) and therefore should be completely without an internal bore or at least with an internal bore of smaller diameter than the adjacent internal bore, provides better manipulability of the cylindrical pin because it makes possible driving the cylindrical pin home and driving it out, and here, however, because of the internal bore, guides the driving tool so that the tool cannot slip sideways and damage the adjacent component.

Cylindrical pins with an internal thread, and thus also with an internal bore, are admittedly already known in the prior art (according to DIN 7979 or ISO 8735), and are known, for example, for building into blind holes and thus for extraction of the cylindrical pin from this bore using the internal thread; this internal thread however neither represents an internal bore with precise central symmetry, nor in its form makes possible a radial yieldability of the cylindrical pin, especially since the internal thread extends over a very short partial region. Such internal threads are of course also—or nevertheless—possible in the cylindrical pin according to the invention in such regions which—as in the waisted middle region —have no radial yieldability.

Besides, the cylindrical pins with internal bore according to the invention can of course also be designed similarly to the conventional cylindrical pins as regards their ends and as regards, for example, having a cross section reduction at the end, chamfered or ground side surfaces, or the like. For reliable insertion of the cylindrical pin into a bore, it is also advantageous if the cylindrical pin has an increased wall thickness in the region of at least one axial end, for local reduction of its radial yieldability. It is thereby prevented that, through the action of a force unevenly distributed over the circumference of the cylindrical pin, this force locally becomes too large in a circumferential surface region and deforms the cylindrical pin. Such an unequal action of a force could arise, for example, if the cylindrical pin is first held at a slight inclination to the bore axis on insertion into a bore, resulting in a radially yieldable circumferential surface regions subjected to a greater and a smaller load. The locally enlarged end wall thickness of the cylindrical pin prevents this, in that the internal bore has a locally reduced diameter in the region of the enlarged wall thickness, i.e., the substantially cylindrical internal bore is reduced in its diameter toward the axial end of the cylindrical pin, and hereby the remaining wall thickness of the cylindrical pin is correspondingly increased and the pin is locally unyieldable in this region.

The essential advantage of the present invention, namely the radial yieldability due to the internal bore extending over a substantial portion of the axial length of the pin is useful not only for connecting or pinning of components, but also for guiding, when the cylindrical pins function as so-called guide pins. Guide pins are inserted into a bore of a component, project on one side with respect to this component, and serve as a lateral guide for, for example, for a strip material moving parallel to the component surface. So that this strip material is not lifted up with respect to the component, the guide pins have a head-like cross sectional enlargement of the circumferential surface at their end projecting from the component. These head-like cross sectional enlargements can of course also be used for pulling the cylindrical pin out of the bore again.

Heretofore such guide pins were fixed to a component by being screwed in from the underside of the component, while they project with respect to the upper side and guide the moving strip material there. In that the cylindrical pin according to the invention is now inserted with oversize and radial yieldability into the bore of the component, it is fixed per se in this bore and no longer has to be screwed in or secured in some other manner against being pulled out axially.

DETAILED DESCRIPTION OF THE PREFERRED EMBODIMENT

Figure 1:
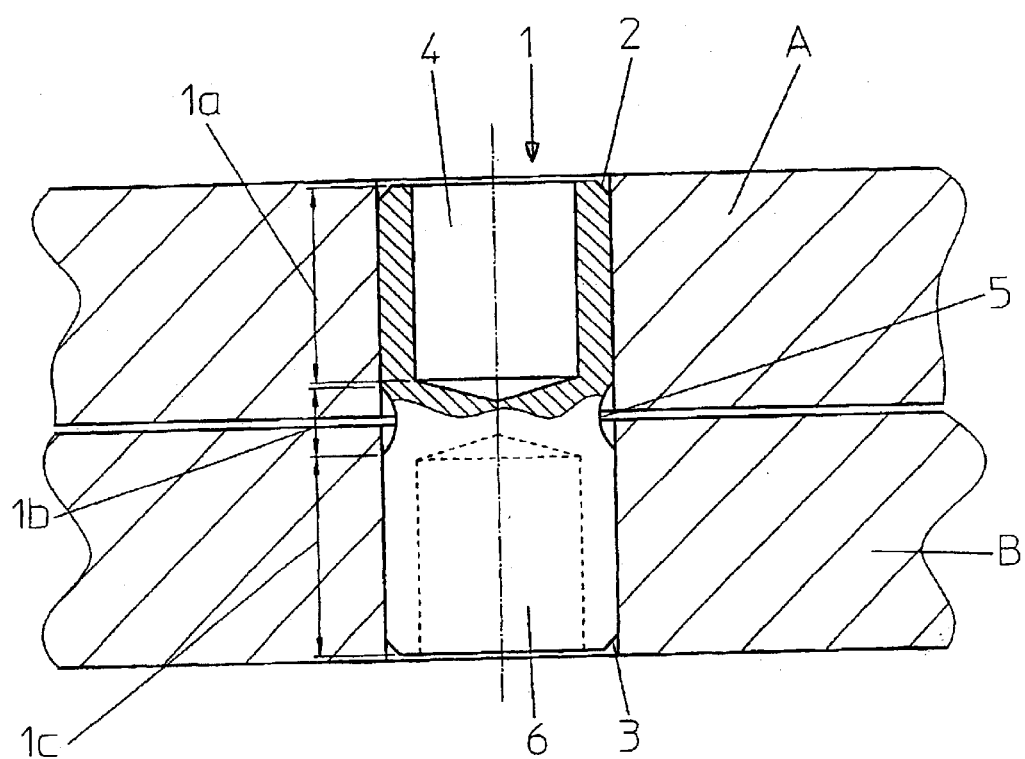
FIG. 1 is a side view of a cylindrical pin in a state fixing two components together.

Referring now to FIG. 1, a cylindrical pin 1 is shown inserted into a bore 2 of a component A and also a bore 3 of a component B and fixes these components together such that the central axes of the bores 2 and 3 are exactly in line with one another. The cylindrical pin 1, which is shown in axial section in the upper section of FIG. 1, has a first partial region 1a which is provided with a central internal bore 4 extending in the axial direction from the end of the pin, with this internal bore 4 extending nearly as far as the axial middle of the cylindrical pin 1. Adjacent to this first partial region 1a is a middle region 1b, in which the cylindrical pin is provided with a cross sectional reduction 5 through a reduction in the external diameter of the cylindrical pin, which is reduced to such an extent over the whole circumference that it is ensured that this waisted middle region 1b has no contact with the internal wall of the bore 2 or bore 3. In this waisted middle region 1b, the cylindrical pin accordingly is not radially yieldable. A second partial region 1c, adjoining the middle region 1b, extends with a central internal bore 6 from near the axial middle as far as the other end of the cylindrical pin 1 in the region of the component B. This second partial region 1c and the internal bore 6 are provided corresponding to the first partial region 1a or the internal bore 4, respectively.

The outer wall of the cylindrical pin, and thus the pin region surrounding the internal bore 4, 6, is to be made thin-walled enough so that radial yieldability is possible in the desired order of magnitude of a few micrometers.

The advantage of the present invention provides is that even if the bores 2 and 3 are formed with a usual tolerance of, for example, 5 $\mu$m, the cylindrical pin, intentionally manufactured oversized, is radially yieldable because of the internal bores 4 and 6, so that the manufacturing tolerances of the cylindrical pin, which are likewise of the order of magnitude of a few $\mu$m, have no effect.

Figure 2:
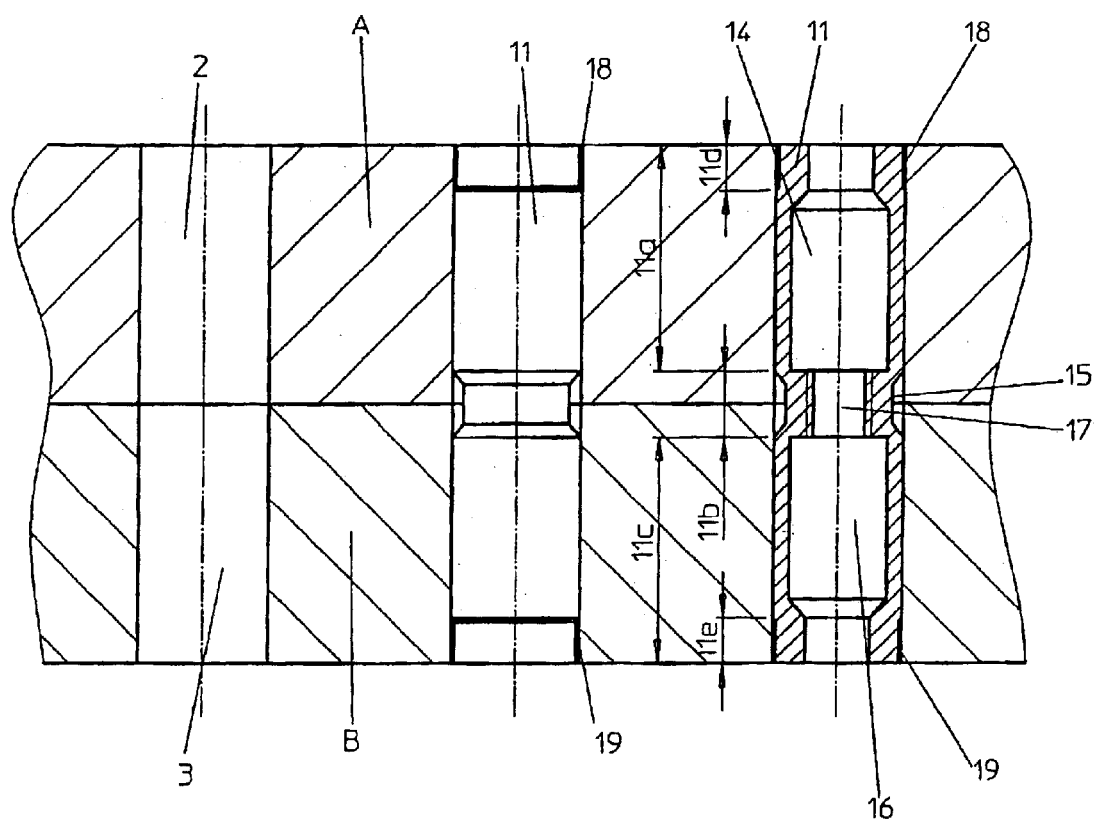
FIG. 2 is an alternative embodiment of the cylindrical pin of FIG. 1.

FIG. 2 shows an alternative embodiment of a cylindrical pin 11, which binds two components A and B together by means of bores 12, 13 provided in these components. This cylindrical pin 11 has three differences from the cylindrical pin 1, each of which could also be implemented individually. In the middle region 11b, which has a waist 15 because of its absence of an internal bore, a screw thread is provided connecting the two internal bores 14, 16 together, and serving for pulling the cylindrical pin out of the bore or bores. This threaded bore 17 is distinguished in form and function from the internal bores 14, 16 which make the radial yieldability possible according to the invention, while the threaded bore 17 can be provided with almost any diameter (however, it must be smaller than the diameter of the internal bores) and as a rule does not provide yieldability of the middle region 11b.

The second distinguishing feature with respect to the cylindrical pin 1 is in that a slight end chamfering of the cylindrical pin 1 is replaced in the cylindrical pin 11 by a marked reduction 18, 19 in the end cross section of the cylindrical pin circumferential surface. This local cross sectional reduction ensures that the cylindrical pin can more easily be inserted into the bore and thereby be better centered.

The third distinguishing feature is provided in that in the cylindrical pin 11, the first partial region 11a, yieldable in the radial direction, and the second partial region 11c, likewise yieldable in the radial direction, have a locally reduced radial yieldability in their end regions, because the wall thickness in the end regions 11d, 11e is increased, in that the diameter of the internal bores 14, 15 is locally reduced.

Admittedly this change of diameter of the internal bore means a slightly increased manufacturing cost; on the other hand, the increased wall thickness hereby obtained makes sure that, on insertion of the cylindrical pin into the component bore, the radial yieldability according to the invention does not lead to damage of the cylindrical pin when the deformation forces resulting from the oversize are not uniformly distributed over the circumference of the cylindrical pin.

Figure 3:
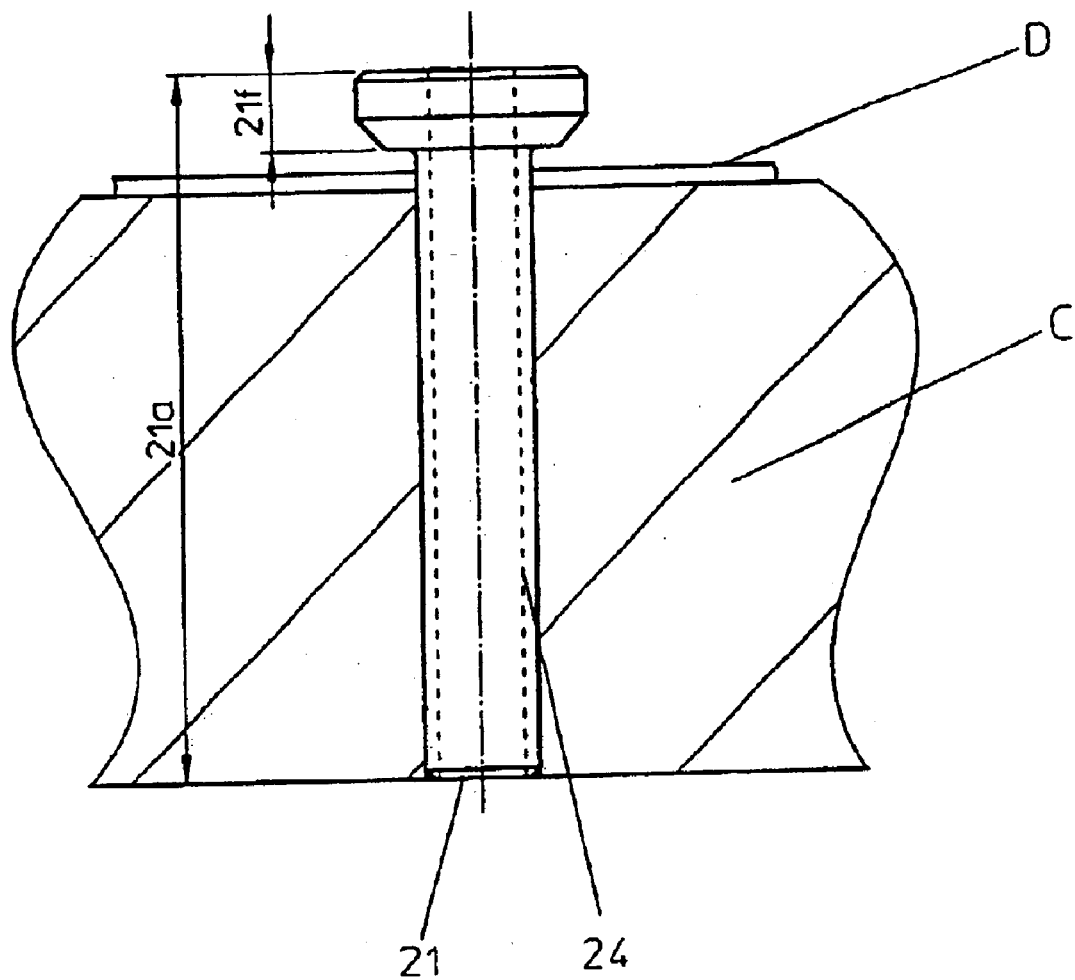
FIG. 3 is a view showing a cylindrical pin functioning as a guide pin.

Finally, FIG. 3 shows a cylindrical pin 21 in the form of a guide pin which is inserted into a bore of a component C and anchors itself there by means of its radial yieldability. For this purpose, the cylindrical pin 21 is provided with an internal bore 24 which extends over approximately the whole axial length of the cylindrical pin 21 in a first partial region 21a. This yieldable first partial region 21a is adjoined by an unyieldable axial partial region 21b, which as a rule is arranged outside the component C. And finally, a head region 21f is arranged adjacent to the middle region 21b, and has a greater external diameter than the rest of the cylindrical pin, and hereby functions for preventing the strip material to be guided by this guide pin from lifting off.

Heretofore, such guide pins always had to be screwed in from the underside of the component C. This is now no longer required, in that the guide pin manufactured oversized is inserted in the bore of the component C and anchors itself there due to its radial yieldability, lying under prestress against the bore wall.

Thus when using the cylindrical pin according to the invention as a guide pin, special attention is not on high accuracy or tolerance equalization on connecting two components, but on the ease of mounting the cylindrical pin provided with the internal bore.

What is claimed is:

1. Cylindrical pin for at least one of connecting and guiding tool, fixture, or machine components, comprising a cylindrical circumferential surface, wherein the cylindrical pin is provided with internal bores extending in an axial direction at least over a substantial portion of an axial length of the pin, the internal bores extending axially, inwardly from each end of the cylindrical pin, the cylindrical pin being divided into a radially yieldable first partial region having one of said internal bores and extending to one axial end of the pin, a middle region arranged adjacent thereto, and adjacent thereto a radially yieldable second partial region having another of said internal bores, and extending to another axial end of the pin, the cylindrical pin having an increased wall thickness in a region of at least one axial end, for local reduction of radial yieldability, wherein the middle region is wasted and is provided with a cross section reduction of the circumferential surface.

2. Cylindrical pin according to claim 1, wherein the internal bores are connected and extend over an entire length of the cylindrical pin.

3. Cylindrical pin according to claim 1, wherein the two internal bores are connected together by a threaded bore having a smaller diameter than the internal bores.

4. Cylindrical pin according to claim 1, wherein the internal bores have a cylindrical form.

5. Cylindrical pin according to claim 1, wherein the internal bore in the region of the increased wall thickness of the cylindrical pin has a locally reduced diameter.

6. Cylindrical pin according to claim 1, wherein the cylindrical pin is chamfered on the circumferential surface.

7. Cylindrical pin according to claim 1, wherein the cylindrical pin is produced oversize with respect to an external diameter.

8. Cylindrical pin according to claim 7, wherein the oversize has an order of magnitude of 0.005–0.020 mm.

9. Cylindrical pin according to claim 1, wherein the internal bores are ground to produce an exactly central symmetry.

10. Cylindrical pin according to claim 1, wherein the cylindrical pin is provided with an end cross sectional reduction in a region of at least one axial end.

* * * * *